United States Patent
Murakami et al.

(10) Patent No.: US 6,745,558 B2
(45) Date of Patent: Jun. 8, 2004

(54) GAS-TURBINE ENGINE CONTROL SYSTEM

(75) Inventors: Hisashi Murakami, Wako (JP); Tsutomu Inoue, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/228,108

(22) Filed: Aug. 27, 2002

(65) Prior Publication Data

US 2004/0011053 A1 Jan. 22, 2004

(30) Foreign Application Priority Data

Aug. 28, 2001 (JP) ........................... 2001-258201

(51) Int. Cl.$^7$ ............................................... F02C 9/28
(52) U.S. Cl. ................................. 60/39.281; 60/737
(58) Field of Search ................... 60/39.281, 737, 60/738

(56) References Cited

U.S. PATENT DOCUMENTS 5,339,635 A * 8/1994 Iwai et al. .................... 60/737
5,628,182 A * 5/1997 Mowill ........................ 60/737
6,327,860 B1 * 12/2001 Critchley .................... 60/737

FOREIGN PATENT DOCUMENTS

JP          2000-248964        9/2000

* cited by examiner

Primary Examiner—Louis J. Casaregola
(74) Attorney, Agent, or Firm—Squire, Sanders & Dempsey L.L.P.

(57) ABSTRACT

In a gas-turbine engine control system, a temperature of the air supplied to mixers and a pressure of the fuel supplied to the mixers are detected and based on the detected fuel pressure, a flow rate of the fuel supplied to the mixers is determined based on at least the detected pressure of the fuel. Then, an adiabatic flame temperature in a combustion chamber is determined based on at least the determined flow rate of the fuel and it is determined whether a selected one of combustion modes including premixed combustion and diffusive combustion is to be switched to other based on the determined adiabatic flame temperature and the detected air temperature and the selected combustion mode is controlled to switch to the other in response to a result of determination. With this, it becomes possible to achieve switchover to the stabler combustion mode and realize better low emission performance by utilizing the premixed combustion range.

7 Claims, 9 Drawing Sheets

FIG. 3

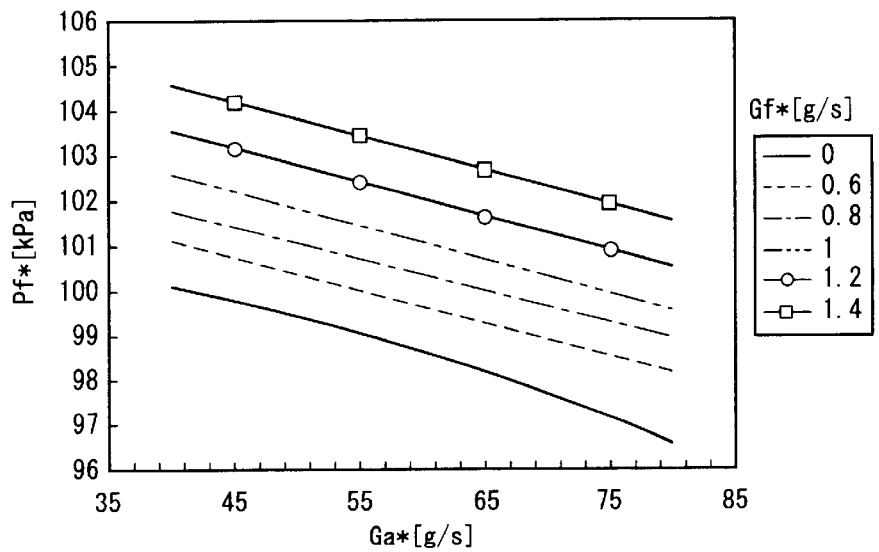

Ga: AIR FLOW RATE [kg/sec]
Ga*: CORRECTED AIR FLOW RATE [kg/sec]
Gf: FUEL FLOW RATE [kg/sec]
Gfpre: PREMIXED COMBUSTION FUEL FLOW RATE [kg/sec]
Gfdiff: DIFFUSIVE COMBUSTION FUEL FLOW RATE [kg/sec]
Gf*: CORRECTED FUEL FLOW RATE [kg/sec]
Gfpre*: CORRECTED PREMIXED COMBUSTION FUEL FLOW RATE [kg/sec]
Gfdiff*: CORRECTED DIFFUSIVE COMBUSTION FUEL FLOW RATE [kg/sec]
Pa: MIXER INLET AIR PRESSURE [kPa abs]
Pfdiff: DIFFUSIVE COMBUSTION FUEL PRESSURE [kPa abs]
Pfpre: PREMIXED COMBUSTION FUEL PRESSURE [kPa abs]
Pfpre*: CORRECTED PREMIXED COMBUSTION FUEL PRESSURE [kPa abs]
ΔPa-f: PRESSURE DIFFERENCE BETWEEN MIXER INLET AIR
   AND PREMIXED COMBUSTION FUEL [kpa]
Ta: MIXER INLET AIR TEMPERATURE [°C]
Tfpre: PREMIXED COMBUSTION FUEL TEMPERATURE [°C]
Ts: REFERENCE TEMPERATURE [°C]
Ps: REFERENCE PRESSURE [kPa abs]
Tad: ADIABATIC FLAME TEMPERATURE [°C]
Tadlimt: PREMIXED COMBUSTION FLAMEOUT LIMIT ADIABATIC
   FLAME TEMPERATURE [°C]
Tads-pre: ADIABATIC FLAME TEMPERATURE (THRESHOLD)
   FOR SWITCHING TO PREMIXED COMBUSTION [°C]
Tads-diff: ADIABATIC FLAME TEMPERATURE (THRESHOLD)
   FOR SWITCHING TO DIFFUSIVE COMBUSTION [°C]
Talimt: PREMIXED COMBUSTION LOWER LIMIT
   MIXER INLET TEMPRATURE [°C]
Hc: LOWER CALORIFIC VALUE
Cpgas: SPECIFIC HEAT OF GASEOUS FUEL AT CONSTANT PRESSURE $$Ga = Ga* \times \frac{Ps}{Pa} \times \sqrt{\frac{Ta}{Ts}}$$

$$Gfpre* = Gfpre \times \frac{Ps}{Pfpre} \times \sqrt{\frac{Tfpre}{Ts}}$$

$$Pfpre = Pa + \Delta Pa\text{-}f$$

$$Pfpre* = Pfpre \times \frac{Ps}{Pa}$$

$$Tad = \frac{Gf \times Hc}{Ga \times Cpgas} + Ta$$

000
GAS-TURBINE ENGINE CONTROL SYSTEM

BACKGROUND OF THE INVENTION

1. Field of the Invention

This invention relates to a gas-turbine engine control system, particularly to a system for controlling stationary gas-turbine engines.

2. Description of the Related Art

Recent years have seen advances in the development of small gas-turbine engines, particularly stationary gas-turbine engines, that are used in combination with relatively small output generators to build independent power plants. Gas-turbine engines of this type use a gaseous fuel that is mixed with air and supplied to a combustion chamber (combustor) to produce premixed combustion or diffusive combustion.

Emission performance, while differing with combustion mode, is characterized by increasing NOx emission concentration with rising combustion temperature. Still, premixed combustion, which can achieve combustion with a homogenous or uniform temperature distribution, is superior to premixed combustion in the point of low emission operation. However, premixed combustion is possible only within a limited range because its low combustion temperature in comparison with diffusive combustion makes the combustion unstable and susceptible to flameout.

On the other hand, diffusive combustion is possible over the entire combustion range but the presence of scattered high-temperature sites increases NOx emission concentration. In order to achieve low emission operation, therefore, it is preferable to switch the combustion mode from diffusive combustion to premixed combustion whenever premixed combustion is possible.

For this purpose, Japanese Laid-open Patent Application No. 2000-248964 (corresponding to U.S. Pat. No. 6,282,885) teaches switching of combustion (combustion mode) in a gas-turbine engine in response to load state or turbine rpm.

Combustion state is, however, difficult to estimate from load state or turbine rpm. Switching of the combustion mode based on these factors therefore does readily enable effective utilization of premixed combustion within the narrow combustion range of this mode.

SUMMARY OF THE INVENTION

An object of this invention is therefore to overcome the foregoing problem by providing a system for controlling a gas-turbine engine that mixes air and gaseous fuel in venturi mixers in accordance with whichever combustion mode between premixed combustion and diffusive combustion has been selected and supplies the resulting air-fuel mixture to a combustor to rotate the turbine, which determines the adiabatic flame temperature and the venturi mixer inlet temperature, and switches the combustion mode based on these temperatures, thereby achieving switchover to the stabler combustion mode and realizing better low emission performance by utilizing the premixed combustion range.

Moreover, when the flow rate of air supplied to the venturi mixers is used when determining the adiabatic flame temperature, the flow rate is preferably determined with high accuracy.

Another object of this invention is therefore to provide a system for controlling a gas-turbine engine control system that mixes air and gaseous fuel in venturi mixers in accordance with whichever combustion mode between premixed combustion and diffusive combustion has been selected and supplies the resulting air-fuel mixture to a combustor to rotate the turbine, which determines the air flow rate with high accuracy, determines the adiabatic flame temperature with high accuracy using the air flow rate, and switches the combustion mode based on the adiabatic flame temperature etc.

The present invention achieves the foregoing objects by providing a system for controlling a gas-turbine engine having a plurality of venturi mixers, connected to an air supply path that passes air compressed by a compressor and to a supply source of gaseous fuel, which mix the air and the fuel in response to selected one of combustion modes comprising premixed combustion and diffusive combustion, to produce an air-fuel mixture and supply the air-fuel mixture to a combustion chamber such that produced combustion gas rotates a turbine that outputs its rotation through an output shaft, while driving the compressor by the rotation; comprising: detecting means for detecting a temperature of the air supplied to the mixers and a pressure of the fuel supplied to the mixers; flow rate determining means for determining a flow rate of the fuel supplied to the mixers based on at least the detected pressure of the fuel; adiabatic flame temperature determining means for determining an adiabatic flame temperature in the combustion chamber based on at least the determined flow rate of the fuel; combustion switching determination conducting means for conducting a determination as to whether the selected one of the combustion modes is to be switched to other of the combustion modes, based on the determined adiabatic flame temperature and the detected air temperature; and combustion switching controlling means for controlling to switch the selected one of the combustion modes to the other in response to a result of determination of the combustion switching determining means.

BRIEF DESCRIPTION OF THE DRAWINGS

The objects and advantages of the invention will be made with reference to the following description and drawings, in which:

FIG. 3 is a graph showing characteristics of mapped data used in the processing procedures in B3 of FIG. 2;

DETAILED DESCRIPTION OF THE PREFERRED EMBODIMENTS

A gas-turbine engine control system according to an embodiment of this invention will now be explained with reference to the attached drawings.

Figure 1:
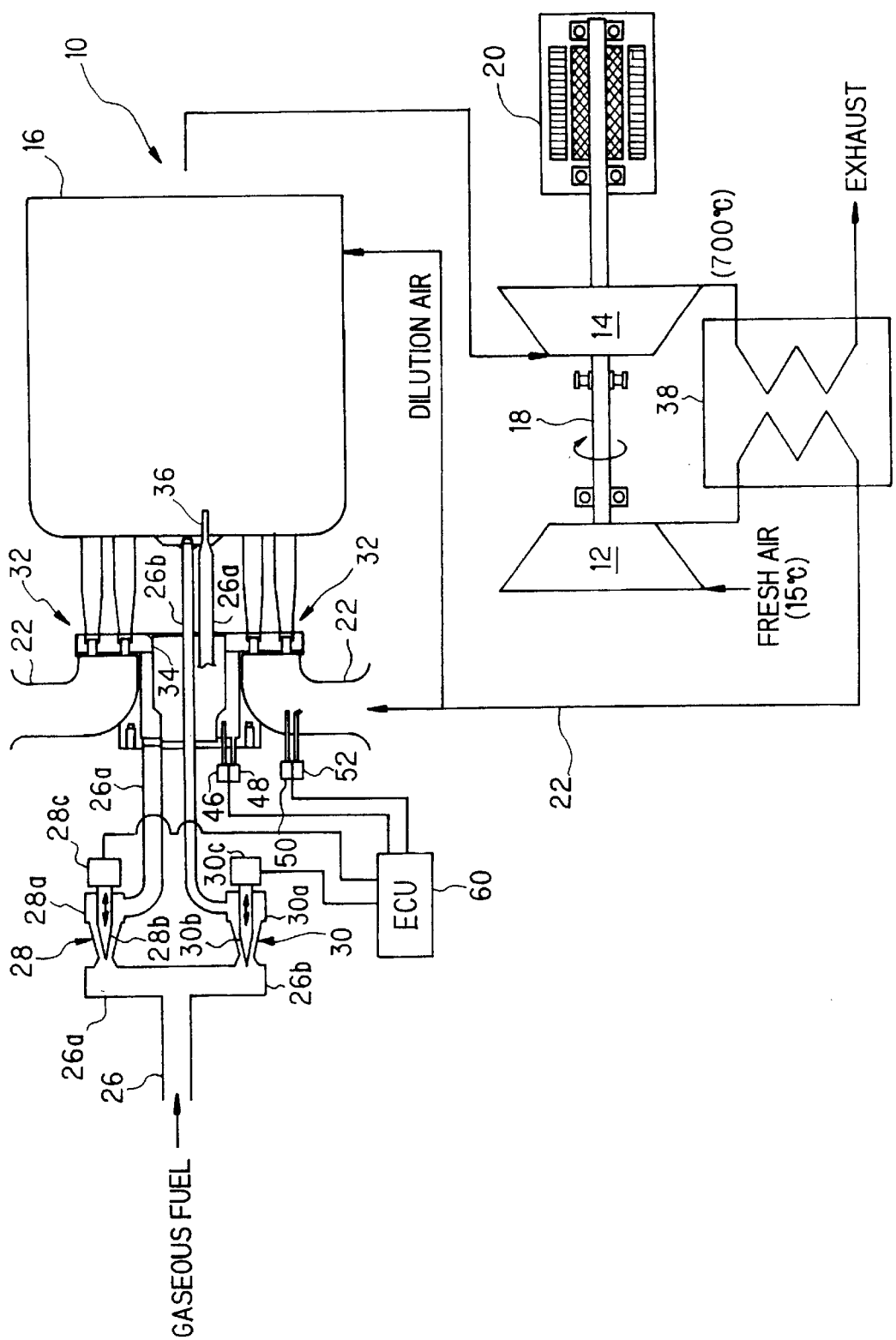
FIG. 1 is an overall schematic view showing a gas-turbine engine control system according to an embodiment of the invention.

FIG. 1 is an overall schematic view of the system.

Reference numeral 10 in FIG. 1 designates the gas-turbine engine as a whole. The gas-turbine engine 10 is equipped with a compressor 12, a turbine 14 and a combustor (combustion chamber) 16. The compressor 12 is driven by rotation of the turbine 14 transmitted through an output shaft (turbine shaft) 18 of the turbine 14 that connects the two.

A generator 20 is connected to the output shaft of the turbine 14. The generator 20 is driven by the rotation of the turbine 14 to generate around 100 kW of electricity. Electrical equipments (not shown) are connected to the generator 20 as a load.

Figure 2:
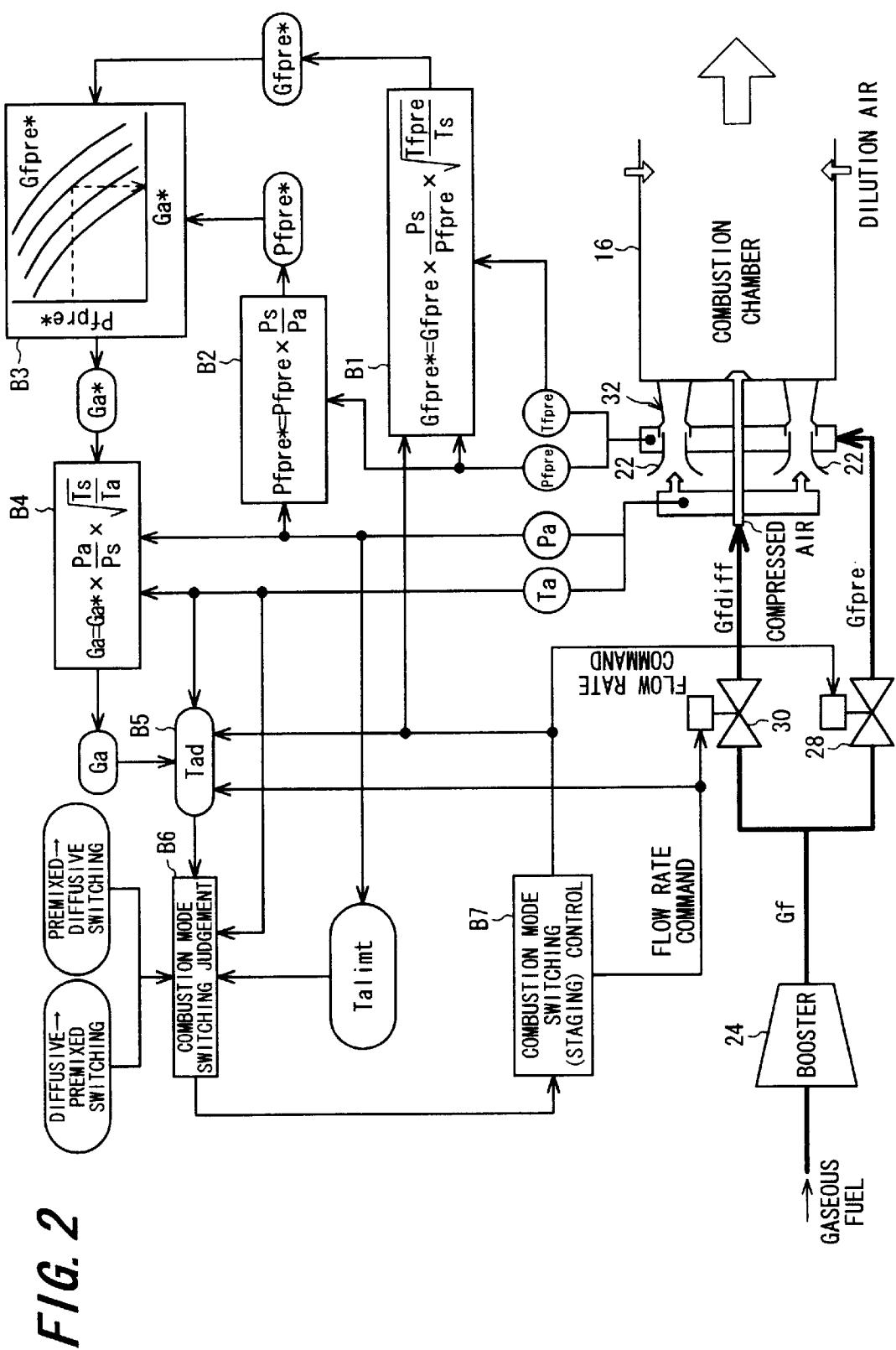
FIG. 2 is a block diagram showing the operation of the system illustrated in FIG. 1.

The combustor 16 is connected with an air intake passage 22 at its air intake port (not shown) and to a fuel supply line 26 connected to a gaseous fuel source (not shown) through a booster 24 (shown in FIG. 2). Natural gas or other such fuel gas is used as the gaseous fuel.

The fuel supply line 26 bifurcates into a branch line 26a and a branch line 26b. A first fuel control valve 28 (metering means) is installed in the branch line 26a and a second fuel control valve (metering means) 30 is installed in the branch line 26b. The first fuel control valve 28 (and second fuel control valve 30) is composed of a housing 28a (30a) connected to the fuel supply line 26, a needle valve element 28b (30b) accommodated in the housing to be capable of advancing and retracting, and an actuator 28c (30c) for axially advancing and retracting the needle valve element 28b (30b). The actuator 28c can be a linear solenoid, stepper motor or the like.

Downstream of the first fuel control valve 28, the branch line 26a of the fuel supply line 26 is connected to a common chamber 34 of multiplexed venturi mixers 32. The multiplexed venturi mixers 32, e.g., twenty-four venturi mixers (only two shown for convenience of illustration) collectively constitute a multi-venturi mixer.

Each venturi mixer 32 is composed of a venturi tube and a throttle. The input end of the venturi tube is connected to the air intake passage 22. The other end consists of a tube that opens into the combustor 16 and is formed with a narrowed throat portion of prescribed area.

The input end of the throttle is connected to the common chamber 34. The output end thereof comprises an opening of prescribed aperture area formed in the throat portion of the venturi tube. It generates an air-fuel mixture by injecting gaseous fuel into air passing through the throat portion.

Downstream of the second fuel control valve 30, the branch line 26b of the fuel supply line 26 passes through the wall of the combustor 16 and extends into its interior. It injects gaseous fuel into the interior of the combustor 16. Reference numeral 36 designates an ignition plug.

In the gas-turbine engine 10 of this embodiment, therefore, gaseous fuel fed through the branch line 26a passes through the venturi mixers 32 to be premixed with air and is then supplied into the interior of the combustor 16 to produce premixed combustion, while gaseous fuel fed through the branch line 26b is supplied into the combustor 16 separately of air to produce diffusive combustion.

Thus, in the gas-turbine engine 10 shown in FIG. 1, air sucked in through an air intake and flowing in through the air intake passage 22 while being compressed by the compressor 12 and gaseous fuel flowing in from the gaseous fuel source are supplied to the combustor 16 and burned, either after being mixed (when the gaseous fuel is passed through the branch line 26a) or separately (when the gaseous fuel is passed through the branch line 26b). The combusted gas rotates the turbine 14, which in turns drives the compressor 12 and the generator 20 (load) through the output shaft 18.

Since, as indicated at the bottom of FIG. 1, the combusted gas used to rotate the turbine 14 is still at a high temperature of around 700° C., it is sent to a heat exchanger 38, where it heats the fresh air (atmospheric air at, for instance, 15° C.) sucked in by the compressor 12 to a temperature of, say, 600° C. The heated air is then supplied to the venturi mixers 32.

The illustrated gas-turbine engine 10 is thus a regenerating gas-turbine engine, i.e., the so-called micro turbine power generation system. Part of the heated air is mixed with the combusted gas as dilution air to dilute the combusted gas.

A first temperature sensor 46 and a first pressure sensor 48 are provided in the branch line 26a of the fuel supply line 26 on the upstream side of the throttles of the venturi mixers 32. The first temperature sensor 46 produces an output proportional to the temperature Tf of the gaseous fuel immediately upstream of the throttle (at the mixer inlets). The temperature Tf is defined as the premixed fuel temperature Tfpre. The first pressure sensor 48 produces an output proportional to $\Delta$pa-f (pressure difference between the (venturi) mixer inlet air pressure and the premixed fuel pressure).

A second temperature sensor 50 and a second pressure sensor 52 are provided in the air intake passage 22 on the upstream side of the venturi tubes of the venturi mixers 32. The second temperature sensor 50 produces an output proportional to the temperature Ta of the air immediately upstream (at the inlets) of the venturi tube (the mixer inlet air temperature). The second pressure sensor 52 produces an output proportional to the pressure Pa of the air immediately upstream (at the inlets) of the venturi tubes (the mixer inlet pressure).

The outputs of the sensors are sent to an ECU (Electronic Control Unit) 60. The ECU 60 includes a microcomputer equipped with a CPU, ROM, RAM and the like (none of which is shown). The ECU 60 determines the gaseous fuel pressure (premixed combustion fuel pressure Pfpre) based on the output proportional to $\Delta$pa-f detected by the first pressure sensor 48 and the mixer inlet air pressure Pa detected by the second pressure sensor 52.

The operation of the gas-turbine engine control system according to this embodiment will now be explained. The operation is in essence an operation conducted by the ECU 60.

FIG. 2 is a block diagram showing the operation.

The ECU 60 first determines which of the premixed combustion and diffusive combustion modes has been selected (switched to) and based on the selected combustion mode produces a flow rate command utilizing an appropriate characteristic curve representing the relationship between the load (generator 20) and the rotational speed (rpm) of the output shaft (turbine shaft) 18 of the turbine 14. It converts the flow rate command into command values indicating degrees of opening of the corresponding one of the first and second fuel control valves 28, 30 and outputs the command values. As a result, fuel is supplied to the combustor 16 at flow rates corresponding to the valve opening command values.

That is, when the first fuel control valve 28 is opened and the second fuel control valve 30 is closed, fuel for premixed combustion is supplied and premixed combustion occurs. On the other hand, when the first fuel control valve 28 is closed and the second fuel control valve 30 is opened, fuel for diffusive combustion is supplied and diffusive combustion occurs.

Thus, the combustion mode is switched by opening and closing the first and second fuel control valves 28, 30. In the ensuing explanation, the flow rate of the fuel for premixed combustion is called premixed combustion fuel flow rate Gfpre and the flow rate of the fuel for diffusive combustion is called diffusive combustion flow rate Gfdiff.

Next, at B1, the ECU 60 substitutes the calculated premixed combustion fuel flow rate Gfpre, the premixed combustion fuel pressure Pfpre among the aforesaid sensor outputs, and the premixed fuel temperature Tfpre into the formula shown in the drawing to calculate a corrected value of the premixed combustion fuel flow rate Gfpre supplied to the combustor 16 (corrected premixed combustion fuel flow rate Gfpre*). At B2, it calculates a corrected value of the premixed combustion fuel pressure Pfpre among the aforesaid sensor outputs (corrected premixed combustion fuel pressure Pfpre*). At B3, it retrieves a corrected air flow rate Ga* supplied to the combustor 16 from mapped data using the calculated values of the corrected premixed combustion fuel flow rate Gfpre* and corrected premixed combustion fuel pressure Pfpre* as address data.

The mapped data characteristics are shown in the top half of FIG. 3 and the parameters appearing in the formulas of B1 etc. are shown in the bottom half. The corrected air flow rate Ga* is a corrected value calculated in accordance with the formula in the lower half of FIG. 3.

All flow rates referred to in this specification are mass flow rates. The calculations of B1 etc. in FIG. 2 are for obtaining premixed combustion fuel flow rate Gfpre. However, this is only an example and the same calculations also apply for obtaining diffusive combustion flow rate Gfdiff. The suffix "pre" is therefore omitted in FIG. 3.

The mapped data characteristics shown in FIG. 3 was created by plotting data obtained by actually measuring the flow rate characteristics of the venturi mixers 32. As shown, values can be retrieved from the mapped data by using the corrected fuel flow rate (specifically, the corrected premixed combustion fuel flow rate) Gf* and the corrected fuel pressure (specifically, the corrected premixed combustion fuel pressure) Pfpre* as address data. While curves are represented for six values of corrected premixed combustion fuel flow rate Gfpre* in FIG. 3, these are only examples.

A "corrected" value here means one converted to that at an arbitrarily defined reference pressure or temperature. Such values are indicated by a suffixed asterisk. "For example, standard atmospheric pressure and 0° C. or (15° C.) are used as the reference pressure and temperature. By mapping corrected values in this way, the air flow rate can be accurately determined despite changes in temperature and pressure.

Next, at B4, the corrected air flow rate Ga* retrieved from the mapped data is multiplied by the reciprocal of the formula shown in the lower half of FIG. 3 to obtain the air flow rate Ga before correction.

Next, at B5, the adiabatic flame temperature Tad is calculated. The formula for this is shown in the lower half of FIG. 3. In the equation shown, the first term on the right side represents temperature produced by combustion and the second term represents initial temperature.

Thus, the adiabatic flame temperature Tad is calculated with high accuracy by plotting the flow rate characteristics of the venturi mixers 32 using data obtained by actual measurement, calculating the temperature rise owing to combustion using the air flow rate etc., retrieved from values corrected to those at the reference pressure and temperature, and adding the result to the initial temperature.

Next, in B6, a combustion mode switching judgment is made based on the calculated adiabatic flame temperature Tad and the detected mixer inlet temperature Ta. Specifically, the judgment is made by comparing the calculated adiabatic flame temperature Tad with, for example, an adiabatic flame temperature threshold value Tads-pre for switching from diffusive combustion to premixed combustion and an adiabatic flame temperature threshold value Tads-diff for switching from premixed combustion to diffusive combustion and by comparing the detected mixer inlet temperature Ta with a premixed combustion lower limit mixer inlet temperature Talimt. This will be explained further below.

Next, at B7, combustion mode switching control is conducted based on the result of the judgment in B6 (combustion mode switching judgment block). More precisely, when the result in B6 (combustion mode switching judgment block) was that the combustion mode should be switched, the switchover is effected in B7. Such a switchover is called "staging" in the explanation that follows.

Figure 4:
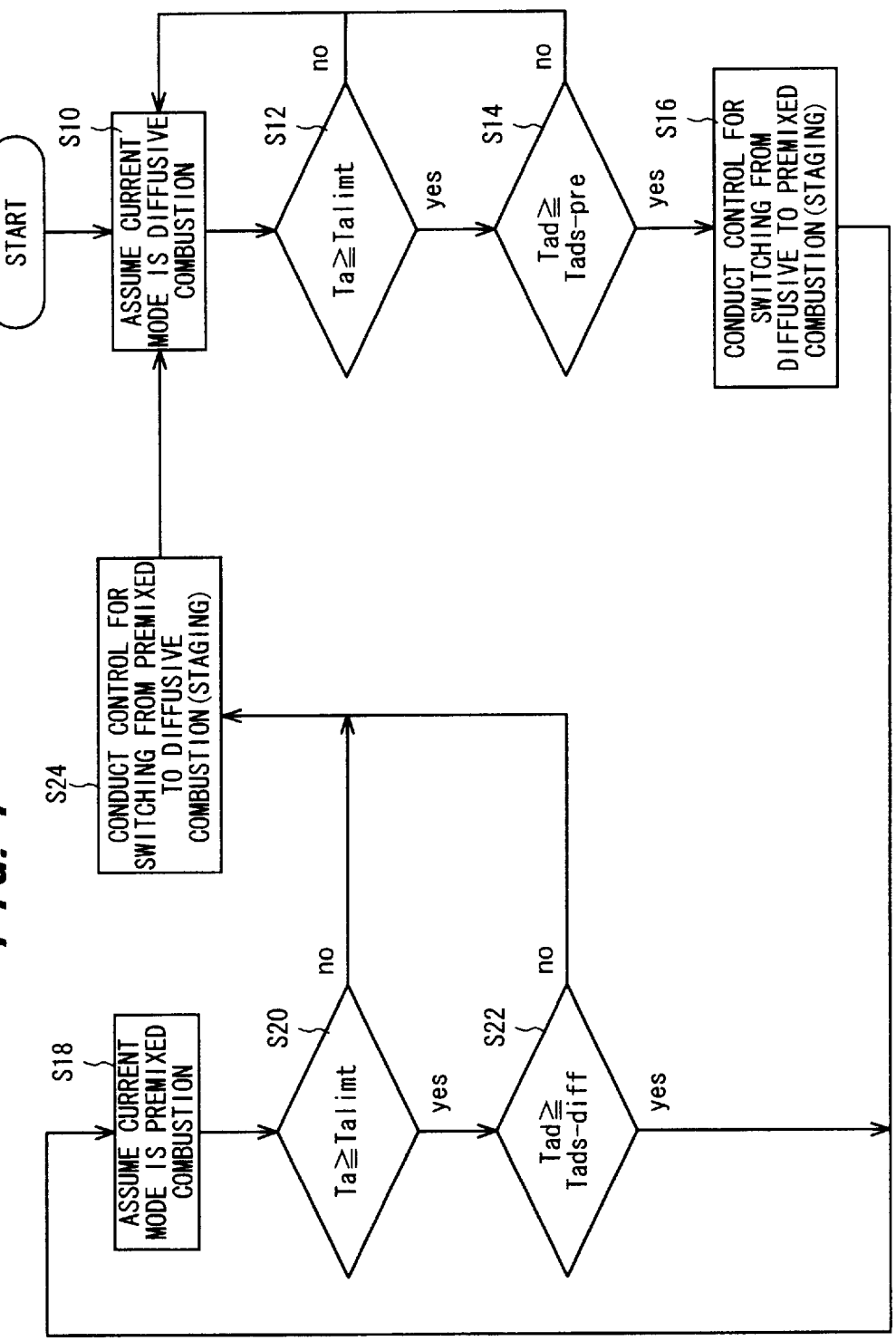
FIG. 4 is a flow chart showing the sequence of processing procedures in B6 of FIG. 2.

FIG. 4 is a flow chart showing the sequence of processing procedures in B6 of FIG. 2. The routine represented in FIG. 2 is activated once every 40 msec.

First, in S10, the current combustion mode is assumed to be diffusive combustion (i.e., the illustrated routine is premised on the current combustion mode being diffusive combustion). Next, in S12, it is checked whether the detected mixer inlet temperature Ta is equal to or higher than Talimt. As explained above, Talimt is the premixed combustion lower limit mixer inlet temperature. In other words, it is the lower limit of the mixer inlet temperature at which premixed combustion is possible.

Figure 5:
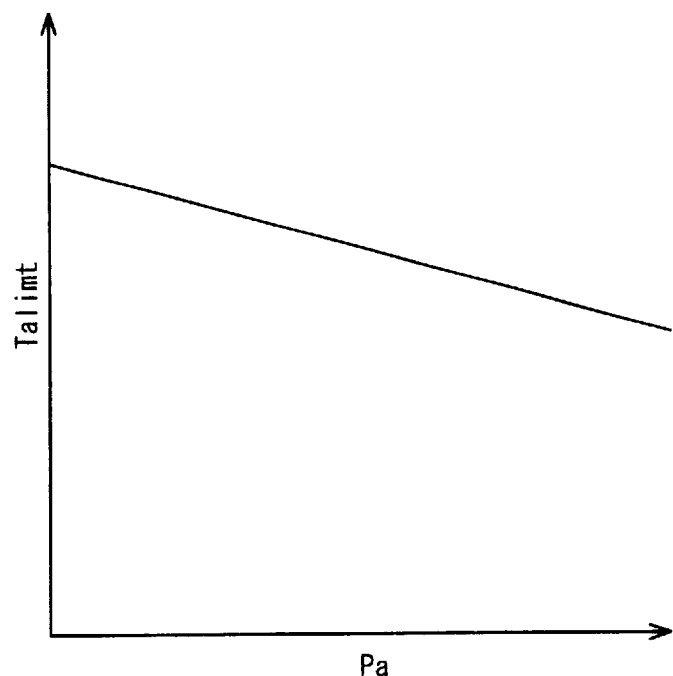
FIG. 5 is a graph showing a characteristic of a premixed combustion lower limit mixer inlet temperature Talimt set relative to a mixer inlet air pressure Pa.

FIG. 5 is a graph showing how Talimt varies as a function of mixer inlet air pressure Pa. As shown, Talimt is defined to decrease with increasing mixer inlet air pressure Pa. This is because, even at the same adiabatic flame temperature, the combustion characteristics differ with the mixer inlet temperature and pressure, i.e., combustion tends to stabilize when temperature and pressure are high and destabilize when they are low. Since the premixed combustion range is thus determined by not only the adiabatic flame temperature but also the mixer inlet air temperature and pressure, Talimt is defined relative to the mixer inlet air pressure Pa in the graph (and, though omitted from the graph, also relative to the mixer inlet air temperature). Specifically, the characteristic curve of Talimt shown in the drawing is defined by determining the relationship between mixer inlet air temperature and pressure that keeps the CO concentration constant when Talimt is maintained constant and the mixer inlet air temperature and pressure are varied.

Figure 6:
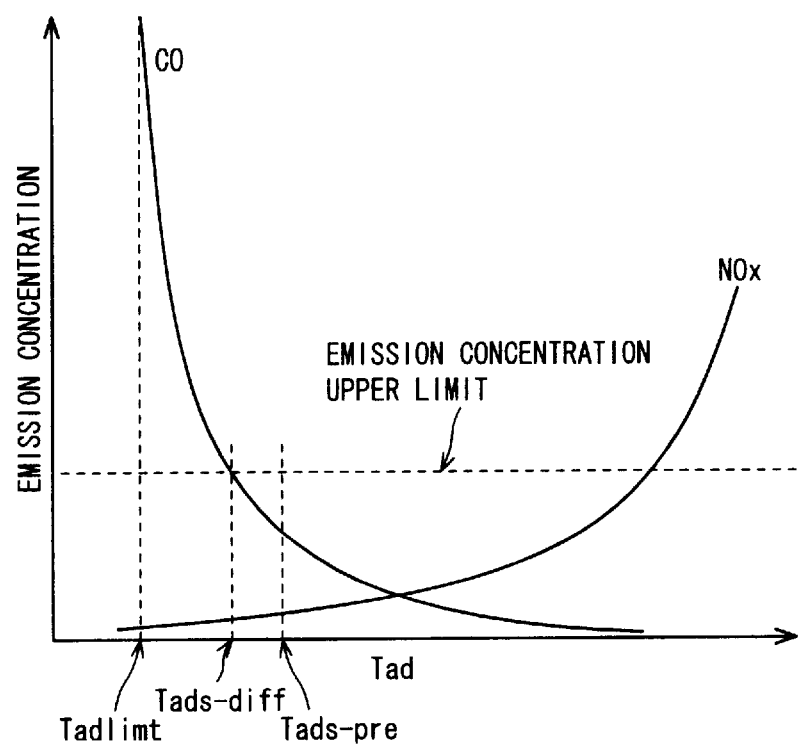
FIG. 6 is a graph showing threshold values referred to in the flow chart of FIG. 4.

When the result in S12 is NO, since this means that premixed combustion is not possible, the program returns S10 to maintain the current combustion mode, i.e., diffusive combustion. When the result is YES, the program proceeds to S14, in which it is checked whether the calculated adiabatic flame temperature Tad is equal to or higher than Tads-pre. As mentioned earlier, Tads-pre represents the adiabatic flame temperature threshold value for switching from diffusive combustion to premixed combustion. It is defined as a function of adiabatic flame temperature Tad as shown in FIG. 6 based on experimentally determined values at which stable premixed combustion can be achieved.

When the result in S14 is NO, since this means that the adiabatic flame temperature conditions necessary for switching to premixed combustion have not yet been established, the program again returns to S10 to maintain the current combustion mode, i.e., diffusive combustion. When the result is YES, since this means that the adiabatic flame temperature conditions necessary for switching to premixed combustion have been established, the program proceeds to S16, in which control for switching the combustion mode from diffusive combustion to premixed combustion (staging) is conducted. This is conducted by the combustion mode switching means (B7).

Figure 7:
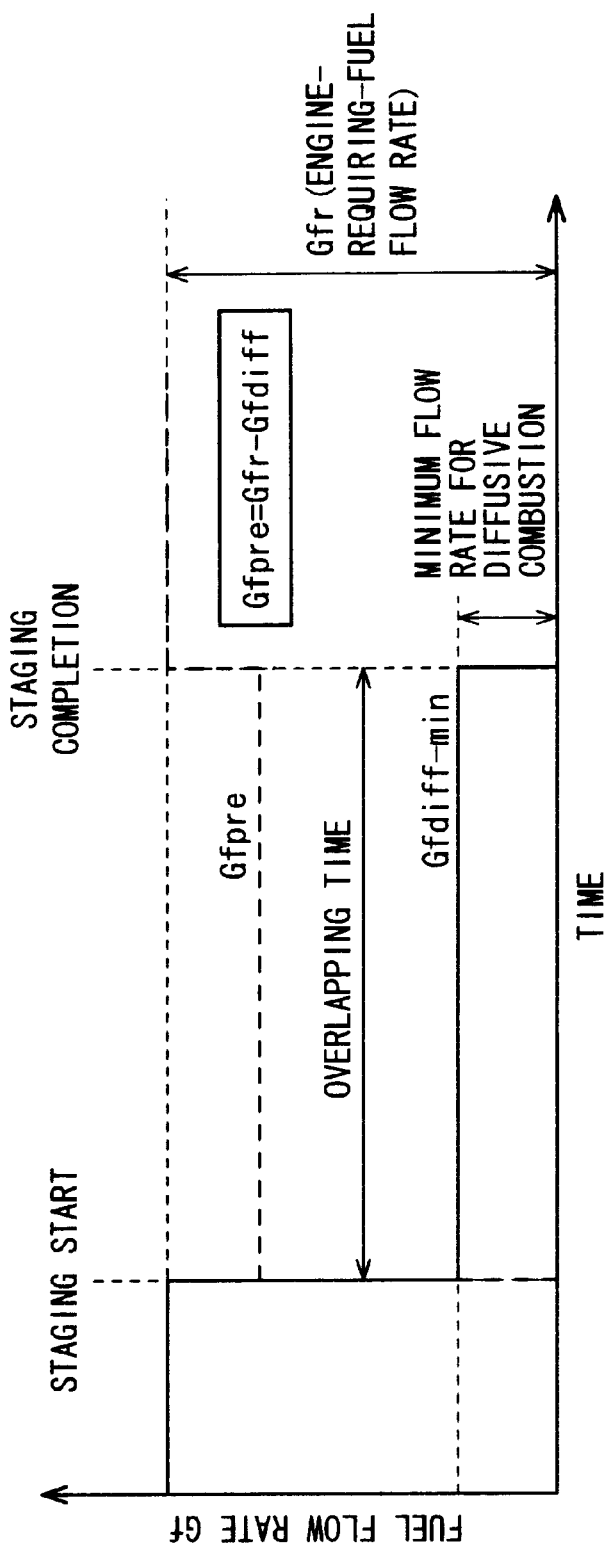
FIG. 7 is a time chart showing control for switching the combustion mode from diffusive combustion to premixed combustion (staging) conducted by the combustion mode switching means in B7 of FIG. 2 and in the flow chart of FIG. 4.

FIG. 7 is a staging time chart.

The feature that characterizes the staging is that when the combustion mode switching means (B7) acts in response to the result of the judgment of the combustion mode switching judgment means (B6) to switch the currently selected combustion mode to the other combustion mode, then if the switchover is to be made from diffusive combustion (the currently selected combustion mode) to premixed combustion, a combustion fuel flow rate, Gf, more specifically Gfpre including at least the (minimum) fuel flow rate Gfdiff-min necessary for diffusive combustion is maintained through the first and second fuel control valves 28, 30 throughout the period (overlapping period) between staging start (switching start) and staging completion (switching completion).

Specifically, where the gas-turbine engine 10 is assumed to require a fuel flow rate Gfr, the combustion mode switching means (B7) effects control during the period between staging start and staging completion for opening the second fuel control valve 30 to maintain a diffusive combustion flow rate Gfdiff to the combustor 16 of a value corresponding to Gfdiff-min and for opening the first fuel control valve 28 to maintain a premixed combustion fuel flow rate Gfpre to the combustor 16 of the value obtained by subtracting Gfdiff-min from Gfr.

In other words, fuel supply is conducted during this period so as to achieve overlapping premixed combustion and diffusive combustion. Highly stable switchover can be realized as a result.

Upon completion of staging, the combustion mode switching means (B7) closes the second fuel control valve 30 and leaves the first fuel control valve 28 open so as to ensure a premixed combustion fuel flow rate Gfpre to the combustor 16 corresponding to Gfr. From this point onward only premixed combustion proceeds.

Since the switchover of the combustion mode to premixed combustion is now complete, in the flow chart of FIG. 4, the program proceeds to S18, in which the current combustion mode is set to premixed combustion, and then to S20, in which it is checked whether the detected mixer inlet temperature Ta is equal to or higher than the aforesaid Talimt.

When the result in S20 is YES, it is checked in S22 whether the calculated adiabatic flame temperature Tad is equal to or higher than Tads-diff. As mentioned earlier, Tads-diff represents the adiabatic flame temperature threshold value for switching from premixed combustion to diffusive combustion. As shown in FIG. 6, it is defined farther to the low-temperature side than Tads-pre.

If only a single threshold value should be set, any error arising in the calculated value of adiabatic flame temperature Tad before and after staging might lead to control hunting that repeatedly switches the combustion mode. The threshold value for switching from diffusive combustion to premixed combustion and the threshold value for switching from premixed combustion to diffusive combustion are therefore separately defined as Tads-pre and Tads-diff. Moreover, in view of the fact unstable combustion resulting in flameout is more likely to occur when switching from diffusive combustion to premixed combustion than when switching from premixed combustion to diffusive combustion, Tads-pre is defined further to the high-temperature side than Tads-diff so as to stabilize combustion when switching from diffusive combustion to premixed combustion.

When the result in S22 is YES, the program returns to S18 in which premixed combustion is continued. When it is NO, since this implies difficulty in continuing premixed combustion, the program proceeds to S24, in which the combustion mode is switched from premixed combustion to diffusive combustion. The program proceeds to S24 when the result in S20 is NO.

Figure 8:
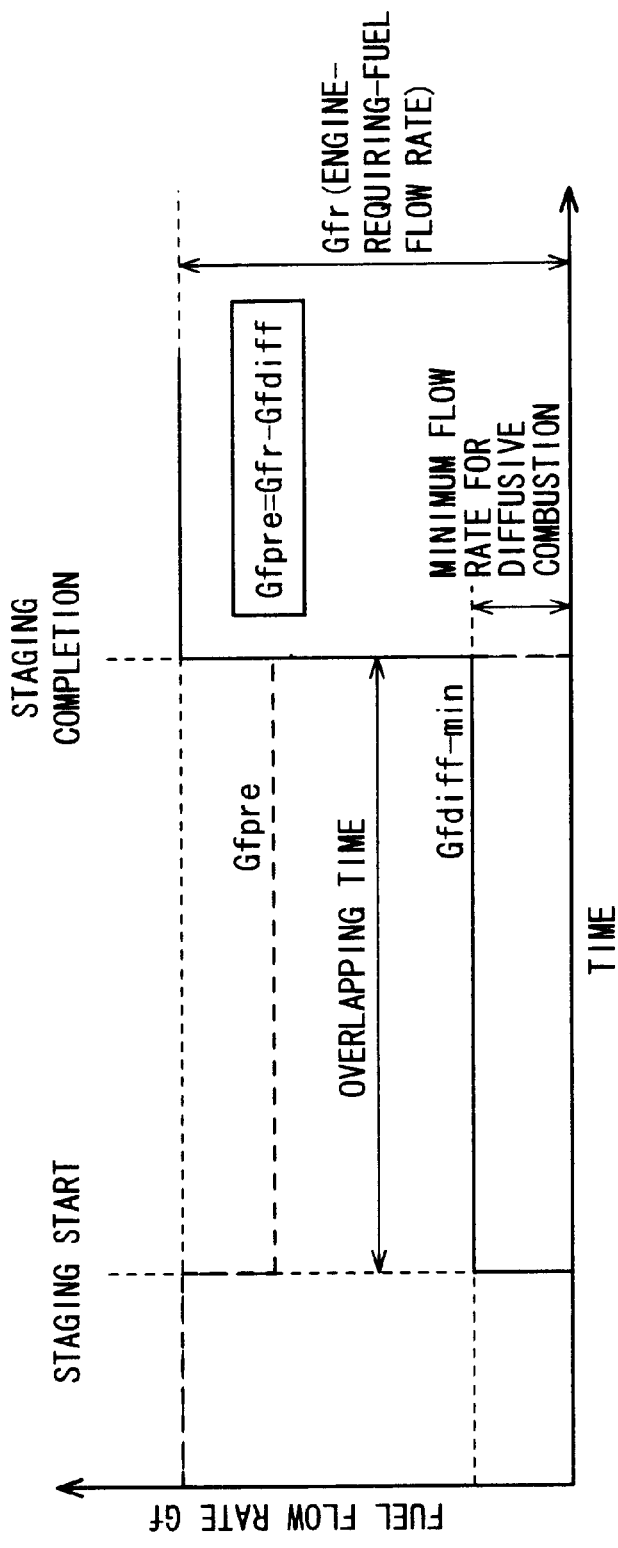
FIG. 8 is a time chart showing control for switching the combustion mode from premixed combustion to diffusive combustion (staging) conducted by the combustion mode switching means in B7 of FIG. 2 and in the flow chart of FIG. 4.

FIG. 8 is a staging time chart of the control for switching from premixed combustion to diffusive combustion.

Similarly to the case of switching from diffusive combustion to premixed combustion described with reference to FIG. 7, when the combustion mode switching means (B7) acts in response to the result of the judgment of the combustion mode switching judgment means (B6) to switch from the currently selected premixed combustion to diffusive combustion, a combustion fuel flow rate Gf including at least the (minimum) fuel flow rate Gfdiff-min necessary for diffusive combustion is maintained through the first and second fuel control valves 28, 30 throughout the period (overlapping period) between staging start (switching start) and staging completion (switching completion).

Specifically, the combustion mode switching means (B7) effects control during the period between staging start and staging completion for opening the second fuel control valve 30 to maintain a diffusive combustion flow rate Gfdiff to the combustor 16 of a value corresponding to Gfdiff-min and for opening the first fuel control valve 28 to maintain a premixed combustion fuel flow rate Gfpre to the combustor 16 of the value obtained by subtracting Gfdiff-min from Gfr. Fuel supply is conducted during this period so as to achieve overlapping premixed combustion and diffusive combustion. Highly stable switchover can be realized as a result.

Upon completion of staging, the combustion mode switching means (B7) closes the first fuel control valve 28 and leaves the second fuel control valve 30 open so as to ensure a diffusive combustion flow rate Gfdiff to the combustor 16 corresponding Gfr. From this point onward only diffusive combustion proceeds.

As explained in the foregoing, this embodiment is configured to constantly monitor the combustion behavior independently of the control and operating schedule of the gas-turbine engine 10 and to switch the combustion mode based on the adiabatic flame temperature, which is a more direct reflection of the combustion behavior than are the conventionally utilized load and engine speed (rpm), and on the mixer inlet temperature, which is a reliable indication of the flameout limit for conducting premixed combustion. As a result, the combustion state can be estimated with high accuracy, switchover to the more stable combustion mode can be achieved, and premixed combustion can be effectively utilized within the narrow combustion range of this mode, thereby enabling improved low emission performance.

Figure 9:
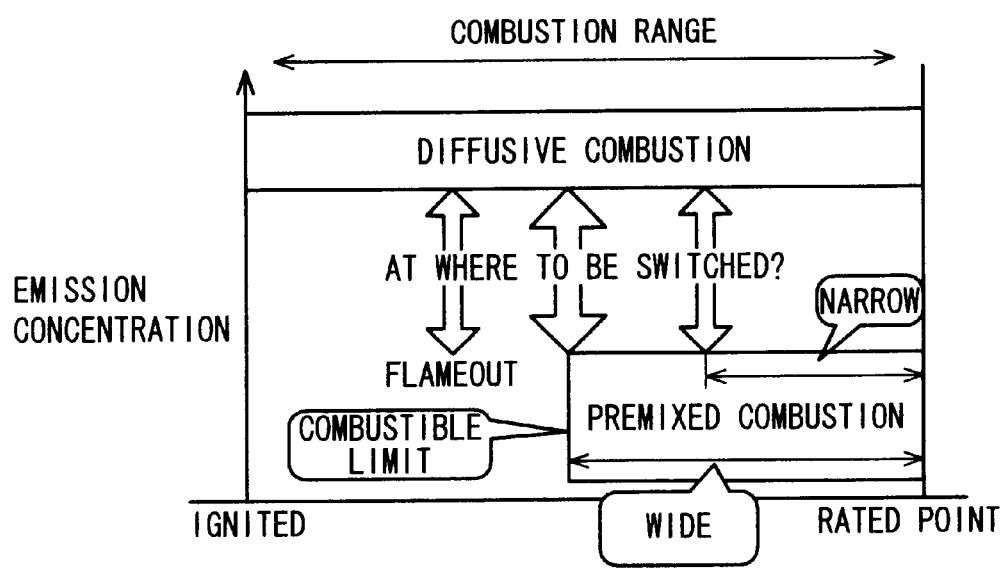
FIG. 9 is an explanatory graph showing the mode of combustion of the system illustrated in FIG. 1.

As shown in FIG. 9, diffusive combustion is possible over the entire combustion range but premixed combustion is possible only within a limited range. In order to enhance low emission performance, therefore, it is necessary to utilize the premixed combustion range to the highest degree possible without inducing flameout.

As explained in the foregoing, in the processing for combustion mode switching of this embodiment, the adiabatic flame temperature Tad that is a more direct reflection of combustion behavior is utilized for comparison with two threshold values, Tads-pre and Tads-diff, premixed combustion is selected when the adiabatic flame temperature Tad is equal to or higher than Tads-pre, and premixed combustion is continued even if the adiabatic flame temperature Tad falls below Tads-pre so long as it is equal to or higher than the second threshold value Tads-diff. As a result, control hunting can be prevented at the time of combustion mode switching.

Thus, the processing adopted for combustion mode switching in this embodiment ensures stable combustion over the whole operating range of the gas-turbine engine 10, effectively reduces CO, NOx and other harmful emissions, and achieves both stable combustion and excellent emission performance. By using two threshold values, moreover, this embodiment enables combustion mode switching to be implemented without causing control hunting in the combustion mode switching control.

This embodiment is further capable of achieving highly stable combustion mode switching because the switching of combustion mode (staging) is controlled so that a combustion fuel flow rate including at least the (minimum) fuel flow rate Gfdiff-min necessary for diffusive combustion is maintained through the first and second fuel control valves 28, 30 throughout the period (lap period) between staging start (switching start) and staging completion (switching completion).

In addition, mapped data is created by plotting data obtained by actually measuring the flow rate characteristics of the venturi mixers 32 and corrected values obtained by converting to a reference pressure and temperature are used as address data for retrieval (calculation). The air flow rate can therefore be determined with high accuracy. The so-determined air flow rate etc. are used to calculate the temperature rise owing to combustion and the result is added to the initial temperature. The adiabatic flame temperature Tad can therefore be calculated with high accuracy.

Figure 10:
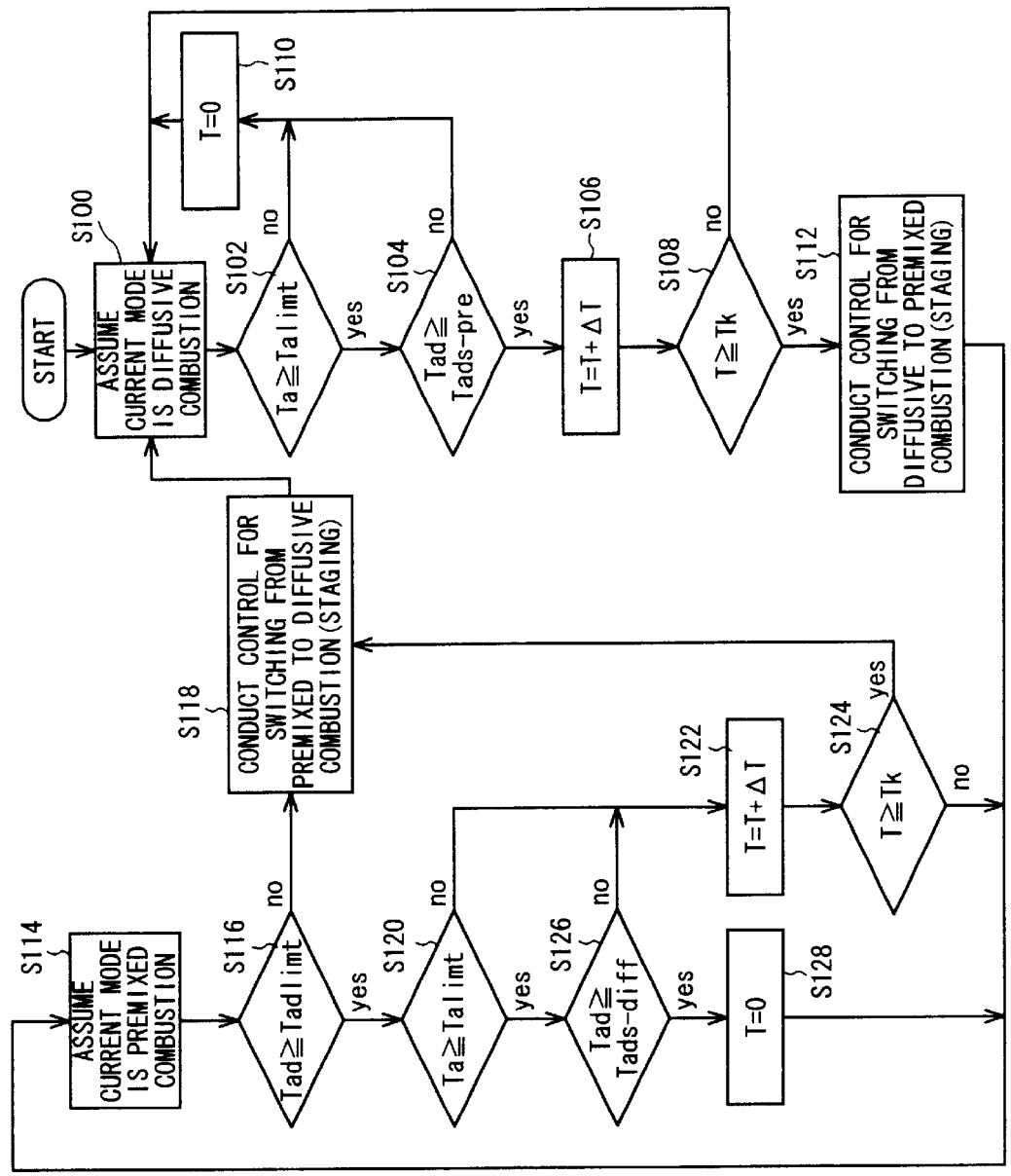
FIG. 10 is a flow chart, similar to FIG. 4 illustrating the sequence of processing procedures in B6 of FIG. 2, but showing the operation of the gas-turbine engine control system according to a second embodiment of the invention.

FIG. 10 is a flow chart similar to that of FIG. 4 showing the sequence of processing procedures of a gas-turbine engine control system according to a second embodiment of this invention, specifically the sequence of processing procedures conducted by the combustion mode switching block B6.

The processing of this second embodiment establishes a combustion mode switching delay time or wait time (Tk), e.g, 0.5 to 10.0 seconds and adds a step for determining the premixed combustion flameout limit.

In S100, the current combustion mode is assumed to be diffusive combustion. Next, in S102, it is checked whether the mixer inlet temperature Ta is equal to or higher than Talimt. When the result is YES, the program proceeds to S104, in which it is checked whether the adiabatic flame temperature Tad is equal to or higher than Tads-pre.

When the result in S104 is YES, the program proceeds to S106, in which a timer value T is incremented a prescribed value $\Delta T$. This is for clocking time elapsed from the time point at which it was determined that the combustion mode should be switched, specifically for clocking time elapsed from the time point at which the adiabatic flame temperature Tad became equal to or higher than the threshold value Tads-pre so that the combustion mode should be switched to premixed combustion. Next, in S108, it is checked whether the timer value T is equal to or greater than a prescribed time Tk.

When the result in S108 is NO, the program returns to S100 to continue diffusive combustion. When the result in S102 or S104 is NO, since this means that the elapsed time clocking condition has not been met, the program proceeds to S110, in which the timer value T is reset to 0, and then returns to S100.

On the other hand, when the result in S108 is YES, since this means that the adiabatic flame temperature conditions for switching to premixed combustion (including the elapsed time condition) have been met, the program proceeds to S112, in which control for switching the combustion mode from diffusive combustion to premixed combustion (staging) is conducted. The switching of combustion mode is carried out in the same way as in the first embodiment.

The program then proceeds to S114, in which the current combustion mode is set to premixed combustion, and to S116, in which it is checked whether the adiabatic flame temperature Tad is equal to or higher than a premixed combustion flameout limit value Tadlimt. The premixed combustion flameout limit value Tadlimt is shown in FIG. 6. This value is the flameout limit in premixed combustion expressed as adiabatic flame temperature. It is obtained by suitable experimentation.

When the result in S116 is NO, since flameout may occur if premixed combustion is continued, the program proceeds to S118, in which the combustion mode is switched from premixed combustion to diffusive combustion (staging) because the exceeding of the flameout limit demands an urgent response. When the result in S116 is YES, the program proceeds to S120, in which it is checked whether the mixer inlet temperature Ta is equal to or higher than the Talimt.

When the result in S120 is NO, the program proceeds to S122, in which the timer value T is incremented the prescribed value $\Delta T$. This is for clocking time elapsed from the time point at which it was determined that the combustion mode should be switched, specifically for clocking time elapsed from the time point at which the mixer inlet temperature Ta fell below the Talimt so that the combustion mode should be switched to diffusive combustion. Next, in S124, it is checked whether the timer value T is equal to or greater than the aforesaid prescribed time Tk.

When the result in S124 is NO, the program returns to S114 to continue the foregoing processing. When it is YES, the program proceeds to S118, in which the combustion mode is switched from premixed combustion to diffusive combustion (staging).

When the result in S120 is YES, it is checked in S126 whether the adiabatic flame temperature Tad is equal to or higher than Tads-diff. When the result is NO, the program proceeds to S122 and the ensuing steps. When it is YES, since this means that the elapsed time clocking condition has not been met, the program proceeds to S128, in which the timer value T is reset to 0.

As explained in the foregoing, the processing of the second embodiment builds on that of the first embodiment by establishing a combustion mode switching delay time or wait time (Tk) and adding a step for determining the premixed combustion flameout limit. It therefore supplements the advantages of the first embodiment by enabling combustion mode switching to be effected with still better stability.

The first and second embodiments are configured to have a system for controlling a gas-turbine engine 10 having a plurality of venturi mixers 32, connected to an air supply path 22 that passes air compressed by a compressor 12 and to a supply source of gaseous fuel, which mix the air and the fuel in response to selected one of combustion modes comprising premixed combustion and diffusive combustion, to produce an air-fuel mixture and supply the air-fuel mixture to a combustion chamber (combustor) 16 such that produced combustion gas rotates a turbine 14 that outputs its rotation through an output shaft 18, while driving the compressor by the rotation; comprising: detecting means (sensors 50, 48, ECU 60) for detecting a temperature of the air supplied to the mixers (mixer inlet air temperature Ta) and a pressure of the fuel supplied to the mixers (Pf); flow rate determining means (ECU 60, B1) for determining a flow rate of the fuel supplied to the mixers (Gf) based on at least the detected pressure of the fuel; adiabatic flame temperature determining means (ECU 60, B5) for determining an adiabatic flame temperature (Tad) in the combustion chamber based on at least the determined flow rate of the fuel; combustion switching determination conducting means (ECU 60, B6) for conducting a determination as to whether the selected one of the combustion modes is to be switched to other of the combustion modes, based on the determined adiabatic flame temperature (Tad) and the detected air temperature (Ta); and combustion switching controlling means (ECU 60, B7) for controlling to switch the selected one of the combustion modes to the other in response to a result of determination of the combustion switching determining means.

Thus, a judgment is made based on the calculated adiabatic flame temperature and the detected mixer inlet temperature regarding switching of whichever combustion mode between premixed combustion and diffusive combustion us currently selected to the other mode and then switches the currently selected combustion mode to the other combustion mode based on the judgment. In other words, the combustion behavior is constantly monitored independently of the control and operating schedule of the gas-turbine engine and the combustion mode is switched based on the adiabatic flame temperature, which is a more direct reflection of the combustion behavior than are the load and engine speed (rpm), and on the mixer inlet temperature, which is a reliable indication of the flameout limit for conducting premixed combustion. As a result, the combustion state can be estimated with high accuracy, switchover to the more stable combustion mode can be achieved, and premixed combustion can be effectively utilized within the narrow combustion range of this mode, thereby enabling improved low emission performance.

In the system, the combustion switching determination conducting means includes; comparing means (ECU 60, S14, S22, S104, S116, S126) for comparing the determined adiabatic flame temperature with a threshold value; and conducts the determination based on a result of comparison.

Thus, the adiabatic flame temperature is compared with a prescribed threshold value and the judgment regarding switching to the other combustion mode is delayed based on the comparison result. It can therefore offers the same advantages as set out above while enabling combustion mode switching to be effected with still better stability.

In the system, the combustion switching determination conducting means delays the determination for a prescribed time (Tk) based on the result of comparison.

Since the judgment regarding switchover to the other combustion mode is delayed for a prescribed time based on the comparison result, it can therefore achieve the same advantages as set out above while enabling combustion mode switching to be effected with still better stability.

In the system, the combustion switching controlling means controls to supply the flow rate of the fuel including at least a flow rate of the fuel necessary for the diffusive combustion (Gfdiff-min) for a period of time from start of the switching to completion of the switching, when controlling to switch the selected one of the combustion modes to the other.

Thus, when the currently selected combustion mode is switched to the other combustion mode, a combustion fuel flow rate including at least the fuel flow rate necessary for diffusive combustion is maintained between switching start and switching completion. It can therefore has the same advantages as set out above while enabling combustion mode switching to be effected with still better stability.

It further includes: air flow rate determining means (ECU 60, B3) for determining a flow rate of the air supplied to the mixers (Ga) in accordance with predetermined characteristics based on the determined flow rate of the fuel and the detected pressure of the fuel; and determines the adiabatic flame temperature in the combustion chamber based on the determined flow rate of the fuel and the determined flow rate of the air.

Thus, the air flow rate supplied to the venturi mixers is determined from a predefined characteristic, specifically a map, using the calculated fuel flow rate and the detected gaseous fuel pressure, and the adiabatic flame temperature is determined based on at least the calculated fuel flow rate and air flow rate, specifically a value obtained by adding the mixture inlet air temperature to the ratio of the calculated fuel flow rate and air flow rate, still more specifically a value obtained by adding the mixer inlet air temperature to the ratio of the product of multiplying the calculated fuel flow rate by the lower heating value of the fuel and the product of multiplying the air flow rate by the fuel specific heat at constant temperature. Since the air flow rate can therefore be calculated with high accuracy, adiabatic flame temperature can be calculated with high accuracy using the calculated air flow rate etc. As a result, the aforesaid switching of the combustion mode can be conducted to take maximum advantage of the premixed combustion range.

In the system, the detecting means includes: air pressure detecting means for detecting a pressure of the air supplied to the mixers; and corrects the determined flow rate of the air based on at least a ratio between the detected air pressure and a reference pressure Ps. Thus, the calculated air flow rate is corrected based on at least the ratio of the detected inlet air pressure and a reference pressure. The air flow rate can therefore be calculated with still higher accuracy.

In addition, the detecting means includes: air pressure detecting means for detecting a pressure of the air supplied to the mixers; and pressure difference detecting means (sensor 48) for detecting a pressure difference (A Pa-f) between the pressure of the air supplied to the mixers and the pressure of the fuel at the mixers; and detects the pressure of the fuel based on the detected pressure of the air and the pressure difference.

The entire disclosure of Japanese Patent Application No. 2001-258201 filed on Aug. 28, 2001, including specification, claims, drawings and summary, is incorporated herein in reference in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A system for controlling a gas-turbine engine having a plurality of venturi mixers, connected to an air supply path that passes air compressed by a compressor and to a supply source of gaseous fuel, which mix the air and the fuel in response to selected one of combustion modes comprising premixed combustion and diffusive combustion, to produce an air-fuel mixture and supply the air-fuel mixture to a combustion chamber such that produced combustion gas rotates a turbine that outputs its rotation through an output shaft, while driving the compressor by the rotation; comprising:

detecting means for detecting a temperature of the air supplied to the mixers and a pressure of the fuel supplied to the mixers;

flow rate determining means for determining a flow rate of the fuel supplied to the mixers based on at least the detected pressure of the fuel;

adiabatic flame temperature determining means for determining an adiabatic flame temperature in the combustion chamber based on at least the determined flow rate of the fuel;

combustion switching determination conducting means for conducting a determination as to whether the selected one of the combustion modes is to be switched to other of the combustion modes, based on the determined adiabatic flame temperature and the detected air temperature; and combustion switching controlling means for controlling to switch the selected one of the combustion modes to the other in response to a result of determination of the combustion switching determining means.

2. A system according to claim 1, wherein the combustion switching determination conducting means includes;

comparing means for comparing the determined adiabatic flame temperature with a threshold value;

and conducts the determination based on a result of comparison.

3. A system according to claim 2, wherein the combustion switching determination conducting means delays the determination for a prescribed time based on the result of comparison.

4. A system according to claim 1, wherein the combustion switching controlling means controls to supply the flow rate of the fuel including at least a flow rate of the fuel necessary for the diffusive combustion for a period of time from start of the switching to completion of the switching, when controlling to switch the selected one of the combustion modes to the other.

5. A system according to claim 1, further including:

air flow rate determining means for determining a flow rate of the air supplied to the mixers in accordance with predetermined characteristics based on the determined flow rate of the fuel and the detected pressure of the fuel;

and determines the adiabatic flame temperature in the combustion chamber based on the determined flow rate of the fuel and the determined flow rate of the air.

6. A system according to claim 5, wherein the detecting means includes:

air pressure detecting means for detecting a pressure of the air supplied to the mixers;

and wherein the detecting means corrects the determined flow rate of the air based on at least a ratio between the detected air pressure and a reference pressure.

7. A system according to claim 1, wherein the detecting means includes:

air pressure detecting means for detecting a pressure of the air supplied to the mixers; and pressure difference detecting means for detecting a pressure difference between the pressure of the air supplied to the mixers and the pressure of the fuel at the mixers;

and wherein the detecting means detects the pressure of the fuel based on the detected pressure of the air and the pressure difference.

* * * * *